United States Patent
Subramanian et al.

(10) Patent No.: US 11,639,417 B2
(45) Date of Patent: May 2, 2023

(54) METHOD FOR THE MANUFACTURE OF POLY(ALIPHATIC ESTER-CARBONATE) COMPOSITIONS AND ARTICLES THEREOF

(71) Applicant: SABIC GLOBALTECHNOLOGIES B.V., Bergen op Zoom (NL)

(72) Inventors: Shankar Kollengodu Subramanian, Mount Vernon, IN (US); Rahul Patil, Mount Vernon, IN (US); James Franklin Hoover, Mount Vernon, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 987 days.

(21) Appl. No.: 16/470,780

(22) PCT Filed: Dec. 19, 2016

(86) PCT No.: PCT/US2016/067516
§ 371 (c)(1),
(2) Date: Jun. 18, 2019

(87) PCT Pub. No.: WO2018/118006
PCT Pub. Date: Jun. 28, 2018

(65) Prior Publication Data
US 2022/0411576 A1    Dec. 29, 2022

(51) Int. Cl.
| C08J 3/12 | (2006.01) |
| C08G 63/64 | (2006.01) |
| C08J 3/20 | (2006.01) |
| C08L 63/10 | (2006.01) |
| C08L 69/00 | (2006.01) |

(52) U.S. Cl.
CPC .............. *C08G 63/64* (2013.01); *C08J 3/12* (2013.01); *C08J 3/203* (2013.01); *C08L 63/10* (2013.01); *C08L 69/005* (2013.01); C08J 2369/00 (2013.01)

(58) Field of Classification Search
USPC ........................................ 528/176, 196, 198
See application file for complete search history.

(56) References Cited

U.S. PATENT DOCUMENTS

| 8,114,929 B2 | 2/2012 | Agarwal et al. |
| 9,062,196 B2 | 6/2015 | Chatterjee et al. |
| 2009/0186966 A1* | 7/2009 | Gallucci ............... C08L 69/005 524/109 |
| 2014/0248483 A1 | 9/2014 | Evans et al. |

FOREIGN PATENT DOCUMENTS

EP    0573680 A1    12/1993

OTHER PUBLICATIONS

International Search Report; International Application No. PCT/US2016/067516; International Filing Date Dec. 19, 2016; dated May 29, 2017; 5 pages.
Written Opinion; International Application No. PCT/US2016/067516; International Filing Date Dec. 19, 2016; dated May 29, 2017; 8 pages.

* cited by examiner

*Primary Examiner* — Terressa Boykin
(74) *Attorney, Agent, or Firm* — Cantor Colburn LLP

(57) ABSTRACT

A process of preparing a compounded hydrostable poly(aliphatic ester-carbonate) includes providing a hydrostable poly(aliphatic ester-carbonate), compounding in an extruder the hydrostable poly(aliphatic ester-carbonate) and 0.05 wt % to 0.60 wt % of a multifunctional epoxide compounding stabilizer, based on the total weight of the compounded hydrostable poly(aliphatic ester-carbonate), under vacuum of 17000 to 85000 Pascals, and a torque of 30% to 75%, to provide the compounded hydrostable poly(aliphatic ester-carbonate). After compounding, at least one of the following apply: the inter-sample variability in molecular weight is less than 5%, wherein inter-sample variability is determined by comparing five 100 mil chips of the compounded hydrostable poly(aliphatic ester-carbonate); the % weight average molecular weight (MW) difference is less than 5% after hydroaging at 85° C. and 85% humidity; or the compounded poly(aliphatic ester-carbonate) has less than 75 ppm of unreacted —COOH end groups measured by $^{31}$P NMR.

20 Claims, No Drawings

METHOD FOR THE MANUFACTURE OF POLY(ALIPHATIC ESTER-CARBONATE) COMPOSITIONS AND ARTICLES THEREOF

CROSS REFERENCE TO RELATED APPLICATIONS

This application is a National Stage application of PCT/US2016/067516, filed Dec. 19, 2016, the entire content of which is incorporated herein by reference.

BACKGROUND

Poly(aliphatic ester-carbonate)s are high flow, ductile materials that are particularly useful in manufacturing articles by injection molding. However, poly(aliphatic ester-carbonate)s, particularly post-compounding, can suffer from inferior hydrostability performance compared to polycarbonates, for example, particularly in high humidity conditions. There remains a need in the art for improved methods of compounding poly(aliphatic ester-carbonate)s, particularly methods that can provide compounded poly(aliphatic ester-carbonate)s with improved hydrostability performance.

BRIEF DESCRIPTION

A process of preparing a compounded hydrostable poly(aliphatic ester-carbonate) comprises
providing a hydrostable poly(aliphatic ester-carbonate), wherein the hydrostable poly(aliphatic ester-carbonate) has at least one of
  a decrease in weight average molecular weight of less than 30%, preferably less than 20% after hydroaging a molded sample for 4 weeks at 85° C. and 85% humidity,
  a decrease in weight average molecular weight of less than 60%, preferably less than 50% after hydroaging a molded sample for 8 weeks at 85° C. and 85% humidity, or
  a —COOH end group content of less than 75 parts per million, preferably less than 50 parts per million as measured by $^{31}$P NMR,
and
compounding in an extruder the hydrostable poly(aliphatic ester-carbonate) and 0.05 wt % to 0.60 wt % of a multifunctional epoxide compounding stabilizer, based on the total weight of the compounded hydrostable poly(aliphatic ester-carbonate), under vacuum of 17000 to 85000 Pascals, and a torque of 30% to 75%, preferably 40% to 60%, to provide the compounded hydrostable poly(aliphatic ester-carbonate),
wherein, after compounding, at least one of the following apply:
  the inter-sample variability in molecular weight is less than 5%, wherein inter-sample variability is determined by comparing five 100 mil chips of the compounded hydrostable poly(aliphatic ester-carbonate),
  the % weight average molecular weight (MW) difference is less than 5% after hydroaging at 85° C. and 85% humidity, wherein $$\% \text{ molecular weight difference} = \frac{MW(\text{sample at week 0}) - MW(\text{sample at week } X)}{MW(\text{sample at week 0})} \times (100)$$

where X=2, 4 or 8; or
the compounded poly(aliphatic ester-carbonate) has less than 75 ppm of unreacted —COOH end groups measured by $^{31}$P NMR.

An article subject to conditions of heat and humidity comprises the foregoing compounded hydrostable poly(aliphatic ester-carbonate), preferably a medical article, a food preparation, storage, or consumption article, a housing, an automotive article, a lens, or a personal protection item, or an article comprising a portion having a thickness in the range of 0.5 millimeter to 2 centimeter, or of 0.1 to 10 millimeter.

A method of improving the hydrostability of a compounded hydrostable poly(aliphatic ester-carbonate) comprises
providing a hydrostable poly(aliphatic ester-carbonate), wherein the hydrostable poly(aliphatic ester-carbonate) has at least one of
  a decrease in weight average molecular weight of less than 30%, preferably less than 20% after hydroaging a molded sample for 4 weeks at 85° C. and 85% humidity,
  a decrease in weight average molecular weight of less than 60%, preferably less than 50% after hydroaging a molded sample for 8 weeks at 85° C. and 85% humidity, or
  a —COOH end group content of less than 75 parts per million, preferably less than 50 parts per million as measured by $^{31}$P NMR,
and
compounding in an extruder the hydrostable poly(aliphatic ester-carbonate) and 0.05 wt % to 0.60 wt % of a multifunctional epoxide compounding stabilizer, based on the total weight of the compounded hydrostable poly(aliphatic ester-carbonate), under vacuum of 17000 to 85000 Pascals, and a torque of 30% to 75%, preferably 40% to 60%, to provide the compounded hydrostable poly(aliphatic ester-carbonate).

A compounded hydrostable poly(aliphatic ester-carbonate) has one or more of the following properties:
  the inter-sample variability in molecular weight is less than 5%, wherein inter-sample variability is determined by comparing five 100 mil chips of the compounded hydrostable poly(aliphatic ester-carbonate),
  the % weight average molecular weight (MW) difference is less than 5% after hydroaging at 85° C. and 85% humidity, wherein $$\% \text{ molecular weight difference} = \frac{MW(\text{sample at week 0}) - MW(\text{sample at week } X)}{MW(\text{sample at week 0})} \times (100)$$

where X=2, 4 or 8; or
the compounded poly(aliphatic ester-carbonate) has less than 75 ppm of unreacted —COOH end groups measured by $^{31}$P NMR.

The above described and other features are exemplified by the following detailed description.

DETAILED DESCRIPTION

The inventors have discovered a method for compounding poly(aliphatic ester-carbonate)s that provides compounded copolymers having improved hydrostability. In particular, the inventors have unexpectedly found that by optimizing compounding conditions, in particular the % torque, vacuum and amount of multifunctional epoxide compounding stabilizer, the compounded copolymers have improved hydrolytic stability. In an especially advantageous feature, the method can be applied to poly(aliphatic ester-carbonate)s prepared by methods that use a lower amount of alkali hydroxide in the initial, low-pH stage of the polymerization of the dicarboxylic acid and bisphenol monomers that provides uncompounded copolymers that have improved hydrolytic stability. The improved hydrolytic stability of the polymers can be maintained by employing the compounding conditions described herein.

Without being bound to theory, it is believed that the ester groups in the poly(aliphatic ester-carbonate)s are particularly susceptible to high humidity conditions, leading to reduced hydrolytic stability of poly(aliphatic ester-carbonate)s compared to polycarbonates, for example. By evaluating a set of compounding variables, the conditions for compounding in an extruder that maintain the hydrostability of poly(aliphatic ester-carbonate)s were determined. Both the inter-sample variability as well as the stability upon hydroaging have been improved. Specifically, the wt % of the compounding stabilizer (e.g., a styrene and a glycidyl (meth)acryiate available under the trade name Joncryl®), the % torque in the extruder, and the vacuum were identified as the most significant variable parameters for optimization of hydrostability. Specifically, the % drop in molecular weight is reduced. These improvements in hydrostability evidenced by a reduced % molecular weight drop is important as it correlated with the Tg drop of the materials and hence the materials remain ductile due to improved hydrostability.

In an embodiment, a process of preparing a compounded hydrostable poly(aliphatic ester-carbonate) comprises providing a hydrostable poly(aliphatic ester-carbonate), and compounding in an extruder the hydrostable poly(aliphatic ester-carbonate) and 0.05 wt % to 0.60 wt %, specifically 0.1 wt % to 0.2 wt %, of a multifunctional epoxide compounding stabilizer, based on the total weight of the compounded hydrostable poly(aliphatic ester-carbonate), under vacuum of 17000 to 85000 Pascals, and a torque of 30% to 75%, preferably 40% to 60%, to provide the compounded hydrostable poly(aliphatic ester-carbonate).

As used herein, the hydrostable poly(aliphatic ester-carbonate) has at least one of a decrease in weight average molecular weight of less than 30%, preferably less than 20% after hydroaging a molded sample for 4 weeks at 85° C. and 85% humidity, a decrease in weight average molecular weight of less than 60%, preferably less than 50% after hydroaging a molded sample for 8 weeks at 85° C. and 85% humidity, or a —COOH end group content of less than 75 parts per million, preferably less than 50 parts per million as measured by $^{31}$P NMR.

After compounding, it is preferred that at least one of the following applies to the compounded hydrostable poly(aliphatic ester-carbonate):

the inter-sample variability in molecular weight is less than 5%, wherein inter-sample variability is determined by comparing five 100 mil chips of the compounded hydrostable poly(aliphatic ester-carbonate), the % weight average molecular weight (MW) difference is less than 5% after hydroaging at 85° C. and 85% humidity, wherein $$\% \text{ molecular weight difference} = \frac{MW(\text{sample at week 0}) - MW(\text{sample at week } X)}{MW(\text{sample at week 0})} \times (100)$$

where X=2, 4 or 8, or the compounded poly(aliphatic ester-carbonate) has less than 75 ppm of unreacted —COOH end groups measured by $^{31}$P NMR.

Exemplary multifunctional compounding stabilizers include a diglycidyl ester or a polyglycidyl ester of a dicarboxylic acid or a polycarboxylic acid; a diglycidyl ether or polyglycidyl ether of a diol or a polyol; a copolymer of styrene and a glycidyl(meth)acrylate; or a combination comprising at least one of the foregoing. For example, compounding stabilizers that are copolymers of styrene and a glycidyl(meth)acrylate are available under the trade name Joncryl®.

The hydrostable poly(aliphatic ester-carbonate)s for compounding can have a weight average molecular weight (Mw) of 10,000 to 50,000 Dalton (Da), or 20,000 to 38,000 Da (measured by gel permeation chromatography (GPC) calibrated using polystyrene standards, corrected for the molecular weight of polycarbonate). In a preferred embodiment, the hydrostable copolymer has an Mw of 35,500 to 37,500 Da. In another preferred embodiment, the Mw is 20,000 to 25,000 Da.

The hydrostable poly(aliphatic ester-carbonate)s can further have other advantageous properties. For example, the poly(aliphatic ester-carbonate)s can have excellent clarity and light transmission properties. For example, the poly (aliphatic ester-carbonate) can have 80 to 100% transmission, more specifically, 89 to 100% light transmission as determined by ASTM D1003-11, using 3.2 mm thick plaques. The poly(aliphatic ester-carbonate) can also have low haze, specifically 0.001 to 5%, more specifically, 0.001 to 1% as determined by ASTM D1003-11 using 3.2 mm thick plaques.

The hydrostable poly(aliphatic ester-carbonate)s can have excellent flow properties, for example a melt volume flow rate (MVR) of 13 cc/10 min or higher at 250° C. and 1.2 kg load, for example 13 to 25 cc/10 min or higher at 250° C. and 1.2 kg load.

The hydrostable poly(aliphatic ester-carbonate)s can have a glass transition temperature of 110 to 145° C., or of 115 to 145° C., or of 128 to 139° C., or of 130 to 139° C.

The hydrostable poly(aliphatic ester-carbonate)s for compounding preferably comprise 5 to 12 mol %, or 6 to 10 mol %, or 7.5 to 9 mol % of units derived from the $C_{6-20}$ aliphatic dicarboxylic acid, as measured by proton nuclear magnetic resonance ($^1$H NMR) spectroscopy or by near infrared (NIR) spectroscopy. In an embodiment, the $C_{6-20}$ aliphatic dicarboxylic acid is adipic acid, sebacic acid, or dodecanoic acid, preferably sebacic acid.

In an embodiment the hydrostable poly(aliphatic ester-carbonate) comprises units derived from 4,4'-dihydroxybiphenyl, 2,2-bis(4-hydroxyphenyl) propane, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, 1,1-bis(4-hydroxy-3-methylphenyl)cyclohexane, or 1,1-bis(4-hydroxyphenyl)-3,3,5-trimethylcyclohexane; specifically 4,4'-dihydroxybiphenyl, 2,2-bis(4-hydroxyphenyl) propane.

Compounding as used herein is performed in an extruder. For example, a neat hydrostable poly(aliphatic ester-carbonate), optionally mixed with one or more additional polymers or additives, is fed into a single or twin-screw extruder, for example via a hopper. Alternatively, one or more additional components can be added downstream, for example through a sidestuffer. The extruder is generally operated at a temperature higher than that necessary to cause the composition to flow, but at which temperature the components of the composition do not decompose so as to significantly adversely affect the desired properties of the composition in particular hydrostability. The method can further comprise extruding the composition and extrudate can be immediately quenched in water and optionally pelletized. The pellets, so prepared, when cutting the extrudate can be one-fourth inch long or less as desired. Such pellets can be used for subsequent molding, shaping, or forming.

Exemplary compounding temperatures can be, for example, 500 to 580° F., preferably 530 to 550° F. as measured close to twin screw with melt temperature in the range of 560 to 610° F., preferably 580-600° F. Exemplary vacuum includes 17000 to 85000 Pascals, specifically 64,300 to 71,200 pascals. Exemplary torque conditions include 30% to 75%, preferably 40% to 60%. Any revolutions per minute (rpm) can be used, again provided that the conditions do not significantly adversely affect the desired properties of the composition in particular hydrostability.

In some embodiments, the hydrostable poly(aliphatic ester-carbonate)s to be compounded are produced by the reaction of a $C_{6-20}$ aliphatic dicarboxylic acid and a bisphenol as comonomers, which are described in further detail below. The relative amounts of each comonomer are adjusted to provide the desired mole ratio of the $C_{6-20}$ aliphatic dicarboxylic acid units to the bisphenol units in the copolymer.

A process to prepare a hydrostable poly(aliphatic ester-carbonate) is interfacial, being conducted in a reaction medium comprising water and a water-immiscible organic solvent, for example, methylene dichloride, 1,2-dichloroethane, chlorobenzene, toluene, or the like. In an embodiment the organic solvent is a chlorinated hydrocarbon, typically a chlorinated aliphatic hydrocarbon, preferably methylene dichloride. The ratio of water to organic solvent at the initiation of polymerization can be 1:4 to 4:1 by volume, or 2:3 to 3:2 by volume, for example 4:5 at the beginning of a given batch polymerization.

The polymerization is a two-stage (or higher) process, where the co-monomers are treated with a carbonyl dihalide, preferably carbonyl dichloride (phosgene) using a specific pH profile. Thus, an initial polymerization reaction mixture comprising the $C_{6-20}$ dicarboxylic acid, a bisphenol, and an alkali hydroxide, are reacted with an initial portion of a carbonyl dihalide over a first time period, while maintaining the reaction at a first pH from 7.0 to 8.0, or 7.2 to 7.8, or 7.3 to 7.7, preferably 7.4 to 7.6. A second (or final) portion of the carbonyl dihalide is added over a subsequent time period while maintaining the reaction pH at a second pH from 9 to 12, preferably from 9.7 to 10.9, to provide a product polymerization mixture comprising the poly(aliphatic ester-carbonate). As is known in the art, the preset pH profile is maintained in the polymerization reaction mixture by addition of dilute alkali hydroxide solution. Vigorous agitation is employed in the polymerization reaction mixture during and after addition of the carbonyl dihalide to ensure homogeneity.

The initial polymerization reaction mixture further contains a strong inorganic base, preferably an alkali hydroxide, more preferably sodium hydroxide or potassium hydroxide. The alkali hydroxide is generally added to the polymerization reaction mixture in the form of an aqueous solution, for example a 10 to 50 wt % aqueous solution (w/w), or a 20 to 40 wt % aqueous solution (w/w).

The alkali hydroxide is present in the initial polymerization reaction mixture to improve the solubility of the co-monomers in the reaction medium. Prior art processes generally employ a large quantity of the alkali hydroxide to improve solubility. Adjusting the amount of alkali hydroxide to decrease the amount used can positively affect the reaction and allow production of copolymers having improved hydrostability and optionally reduced —COOH end group content. In an embodiment, the amount of alkali hydroxide in the initial polymerization reaction mixture is an amount effective to provide a poly(aliphatic ester-carbonate) having a —COOH end group content of less than 75 parts per million (ppm), preferably less than 50 ppm as measured by $^{31}$P NMR. In other embodiments, the amount of alkali hydroxide is adjusted to effect an increase in the fraction of the first time period that proceeds at an actual (measured) pH of 7 to 8 compared to the same reaction mixture with a higher amount of alkali hydroxide in the initial polymerization mixture. The fraction of the first time period at a measured pH of 7 to 8 can be at least 70%, preferably at least 80%, more preferably at least 90% of the total duration of the first time period. It has been unexpectedly found that the amount of alkali hydroxide effective to increase the fraction of the first time period that proceeds at an actual (measured) pH of 7 to 8 is of critical importance to achieving a near complete incorporation of dicarboxylic acid into the polymer in the limited time duration available for polymerization and thereby permits achieving high throughput. In an advantageous feature, the methods herein do not increase the second, subsequent period of time compared to the same reaction mixture with a higher amount of alkali hydroxide in the initial polymerization mixture.

The length of the first time period can be more than 9 minutes. In some embodiments, the length of the first time period can be 9 minutes to 30 minutes, or less than 20 minutes, more preferably 11 to less than 20 minutes. The length of the second time period can be 10 minutes or greater, for example 10 to 30 minutes, preferably 13 to 23 minutes. As is known in the art, the increase in pH from the first step to the second step occurs over a finite amount of time, for example 1 to 5 minutes. Herein, the time spent during the pH increase from first low pH step to second high pH step is included within the second time period.

The initial portion of the carbonyl dihalide add during the first time period can be 28 to 50% of the total amount of carbonyl dihalide, preferably 32 to 43% of the total amount of carbonyl dihalide. The second portion of the carbonyl dihalide can be the remaining amount to provide addition of 100% of the desired amount of carbonyl halide.

The polymerization can further be conducted in the presence of a catalyst system. Catalyst systems are known in the art, and include, for example, various tertiary amines as condensation catalysts and phase transfer catalysts. Among tertiary amines that can be used as catalysts in interfacial polymerization are aliphatic tertiary amines such as triethylamine and tributylamine, cycloaliphatic tertiary amines such as N,N-diethyl-cyclohexylamine, and aromatic tertiary amines such as N,N-dimethylaniline. Phase transfer catalysts that can be used are catalysts of the formula $(R^3)_4Q^+X$, wherein each $R^3$ is the same or different, and is a $C_{1-10}$ alkyl; Q is a nitrogen or phosphorus atom; and X is a halogen atom or a $C_{1-8}$ alkoxy or $C_{6-18}$ aryloxy. Exemplary phase transfer catalysts include $(CH_3(CH_2)_3)_4NX$, $(CH_3(CH_2)_3)_4PX$, $(CH_3(CH_2)_5)_4NX$, $(CH_3(CH_2)_6)_4NX$, $(CH_3(CH_2)_4)_4NX$, $CH_3(CH_3(CH_2)_3)_3NX$, and $CH_3(CH_3(CH_2)_2)_3NX$, wherein X is Cl⁻, Br⁻, a $C_{1-8}$ alkoxy or a $C_{6-18}$ aryloxy. In an embodiment, the catalyst system comprises triethyl amine and methyltributyl ammonium halide or hexabutylbutylene diammonium halide. An effective amount of the catalyst system can be 0.1 to 10 wt %, or 0.5 to 2 wt %, each based on the weight of bisphenol in the reaction mixture. Alternatively, the amount of tertiary amine catalyst can be expressed as 0.75 to 3.0 mole percent, based on the moles of bisphenol.

Other components as is known in the art can be present in the polymerization reaction mixture. For example, an end-capping agent (also referred to as a chain stopper or chain terminating agent) can be included during polymerization to provide end groups. Exemplary endcapping agents include monocyclic phenols such as phenol and $C_1$-$C_{22}$ alkyl-substituted phenols such as p-cumylphenol (PCP), resorcinol monobenzoate, and p-and tertiary-butyl phenol, monoethers of diphenols, such as p-methoxyphenol, and alkyl-substituted phenols with branched chain alkyl substituents having 8 to 9 carbon atoms, 4-substituted-2-hydroxybenzophenones and their derivatives, aryl salicylates, monoesters of diphenols such as resorcinol monobenzoate, mono-carboxylic acid chlorides such as benzoyl chloride, $C_1$-$C_{22}$ alkyl-substituted benzoyl chloride, toluoyl chloride, bromobenzoyl chloride, cinnamoyl chloride, and 4-nadimidobenzoyl chloride, polycyclic, mono-carboxylic acid chlorides such as trimellitic anhydride chloride, and naphthoyl chloride, functionalized chlorides of aliphatic monocarboxylic acids, such as acryloyl chloride and methacryoyl chloride, and monochloroformates such as phenyl chloroformate, alkyl-substituted phenyl chloroformates, p-cumyl phenyl chloroformate, and toluene chloroformate. Combinations of different end groups can be used. The amount of endcapping agent in the polymerization reaction mixture is adjusted to provide the desired copolymer molecular weight, as is known in the art. For example, the amount of endcapping agent can be 0.1 to 10 mol %, based on the amount of bisphenol.

A chelating agent can be present to remove residuals from (for example) the components in the operations systems. To remove this iron, sodium gluconate can be added as a chelating agent in an effective amount, which can be determined by one of ordinary skill in the art without undue experimentation. Exemplary amounts can be 1 to 1,000 parts per million by weight, based on the amount of water used.

The order of addition of the reactants and other components present during polymerization can be varied. As used herein, the term "initial polymerization reaction mixture" is a term of convenience referring to all components present during the polymerization except for the carbonyl dihalide. Thus, in some embodiments, all of the components used in the polymerization are pre-combined, and thus present simultaneously before the carbonyl dihalide is added to initiate polymerization. In other embodiments, not all of the components are pre-combined; instead, some of the components are pre-combined, and the remaining components are added with the carbonyl dihalide. In these embodiments, "providing the initial polymerization reaction mixture" occurs simultaneously with addition of the carbonyl dihalide. These various embodiments of the polymerization step are described in more detail below and one or more of the polymers prepared using these embodiments were used for the compounding experiments discussed in examples.

For example, the bisphenol, water, organic solvent, $C_{6-20}$ aliphatic dicarboxylic acid, optionally the catalyst system, and optionally all or a portion of the alkali metal hydroxide can be combined in a pre-formulation tank, and then transferred to a batch polymerization reactor. Where all of the alkali metal hydroxide is added in the pre-formulation tank, polymerization is initiated by the addition of the carbonyl dihalide. Alternatively, where none or only a portion of the alkali metal hydroxide is added in the pre-formulation tank, any remaining portion of the alkali metal hydroxide can be added to the batch polymerization reactor before or after transfer, and then the polymerization initiated by the addition of the carbonyl dihalide.

In a specific example of this embodiment, the $C_{6-20}$ aliphatic dicarboxylic acid, and the bisphenol A are added as powder to the formulation tank, together with 33 wt % alkali hydroxide solution, in a stoichiometric equivalence of two moles dry caustic per mole of dicarboxylic acid, along with solvent, water, chelating agent and catalyst. Generally, a 10% excess caustic can be used on dry caustic moles basis, based on the moles of the dicarboxylic acid. The mixture is stirred for up to 30 mins to form a slurry in the formulation tank. The slurry from formulation tank is transferred to the reactor and is then phosgenated. A 33 wt % alkali hydroxide solution is added as needed to maintain the desired pH profile. The phosgene set point for the polymerization is selected to allow for batch completion in a robust fashion and is 15 to 50% in excess of stoichiometric requirement. An endcapping agent can be added to the reactor before or after polymerization is initiated. For the first part of the reaction that typically starts at the beginning of phosgenation and ends at less than or equal to 50% of batch phosgene set point, the pH is maintained in the range of 7 to 8. The pH set point is then ramped from 7.5 to 10.3 for the remainder of the batch phosgene addition duration to complete polycarbonate formation and hence complete the polymerization of the reaction materials.

In another specific example of this embodiment, the dicarboxylic acid is added in powder form to the formulation tank along with bisphenol, solvent, water, chelating agent, and catalyst. The polymerization reactor is charged alkali hydroxide solution (e.g., 33 wt %) in stoichiometric equivalence of two moles dry caustic per mole of dicarboxylic acid. Additionally, a 10% excess caustic can be used on dry caustic basis. The slurry from the formulation tank is transferred to the reactor and is then phosgenated while maintaining the desired pH profile with addition of alkali hydroxide solution (e.g., 33 wt %). The phosgene set point for the batch is chosen to allow for batch completion in a robust fashion and is 15 to 50% in excess of stoichiometric quantity. For the first part of the reaction, which typically starts at the start of phosgene addition and ends at up to 50% of batch phosgene set point, pH is maintained in the range of 7 to 8. The batch pH set point is then gradually increased to 10.3 for the remainder of the batch to complete polycarbonate formation.

In a second embodiment, the bisphenol A, water, organic solvent, and optionally the catalyst system are first combined in a formulation tank, followed by the addition of the $C_{6-20}$ aliphatic dicarboxylic acid. The $C_{6-20}$ aliphatic dicarboxylic acid can be added to the process by various delivery modes. For example, the $C_{6-20}$ aliphatic dicarboxylic acid can be added as a solid or as a slurry in water, and the alkali metal hydroxide can be added separately. Alternatively, the $C_{6-20}$ aliphatic dicarboxylic acid can be pre-dissolved in water by the addition of the alkali metal hydroxide. Additional alkali metal hydroxide, generally in the form of an aqueous solution, can be added to the formulation tank to further help dissolve the bisphenol and the $C_{6-20}$ aliphatic dicarboxylic acid. The mixture can be stirred to form a slurry and transferred to a polymerization reactor. Optionally, the formulation tank can be rinsed with the solvent to ensure complete slurry transfer to the reactor. Polymerization is initiated by the addition of the carbonyl dihalide to the polymerization reactor. The endcapping agent can be added to the reactor before or after polymerization is initiated.

In a third embodiment of the process, the bisphenol, water, and organic solvent are pre-combined, and then transferred to a polymerization reactor, and the $C_{6-20}$ aliphatic dicarboxylic acid is added to the polymerization reactor. Again, the $C_{6-20}$ aliphatic dicarboxylic acid can be added as a solid, or as a slurry in water separately from the alkali metal hydroxide; or the $C_{6-20}$ aliphatic dicarboxylic acid can be added to the reactor as a solution pre-dissolved in water by the addition of the alkali metal hydroxide. In this embodiment, the direct addition of the $C_{6-20}$ aliphatic dicarboxylic acid to the polymerization reactor can occur before or during addition of the carbonyl dihalide, for example during the phosgenation step. The endcapping agent can be added to the reactor before or after polymerization is initiated. Similarly, the catalyst system can be added to the reaction mixture either before the carbonyl dihalide or at a suitable stage during reaction. Preferably the catalyst system is charged to the reaction mixture before addition of the carbonyl dihalide.

In a specific example of this third embodiment, the $C_{6-20}$ aliphatic dicarboxylic acid is pre-dissolved in water by addition of the base in an amount effective to provide a stoichiometric equivalence with the —COOH functional group moieties. Generally, a 10% excess caustic can be used on molar basis. The dicarboxylic acid solution is added to the other components of the polymerization mixture at the beginning of reaction after all of the other components, including catalyst, have been charged to the reactor. The carbonyl dihalide set point is selected to achieve substantial completion of the reaction, which is generally a 15 to 50% excess of stoichiometric quantity. For up to 50% of the total carbonyl dihalide added during the polymerization reaction, the pH of the reaction is maintained in the range of 7 to 8 with a target pH of 7.5. After the addition of the dicarboxylic acid solution is complete, the pH set point is increased from 7.5 to 10.3 over 3.5 minutes and is held at 10.3 during the remainder of the carbonyl dihalide addition.

The poly(aliphatic ester-carbonates) produced by the processes described herein are copolymers that include aliphatic ester units and aromatic carbonate units of formula (1)

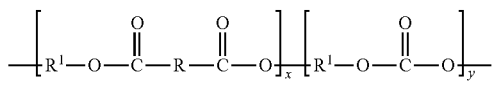

(1)

wherein R is an aliphatic $C_{4-20}$, or $C_{6-16}$, or $C_{10-12}$ group derived from a dicarboxylic acid (2) as described below, and each $R^1$ is independently derived from a dihydroxyaromatic compound of formula (3) as described below, and x and y each represent average weight percentages of the aliphatic ester units and the carbonate units, wherein the average ratio of x:y is 10:90 to 0.5:99.5, specifically 9:91 to 1:99, and more specifically 8:92 to 3:97, where x+y is 100

In some embodiments, the poly(aliphatic ester-carbonates) produced by the processes described herein are copolymers that include aliphatic ester units and aromatic carbonate units of formula (1a)

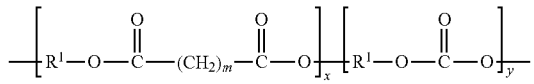

(1a)

where each $R^1$ is independently derived from a bisphenol of formula (2) as described below, m is 6 to 20, and x and y each represent average weight percentages of the aliphatic ester units and the carbonate units, wherein the average ratio of x:y is 10:90 to 0.5:99.5, specifically 9:91 to 1:99, and more specifically 8:92 to 3:97, where x+y is 100.

The aliphatic ester units are derived from a $C_{6-20}$, or a $C_{6-18}$, or a $C_{10-12}$ aliphatic dicarboxylic acid, or reactive derivative thereof. As used herein, an "aliphatic" carboxylic acid is not aromatic, and can include cyclic or noncyclic, straight or branched chain groups, and can be fully saturated, or contain up to three unsaturations. In an embodiment, the aliphatic dicarboxylic acid is cyclic or straight chain, and is fully saturated. The carboxylic acid groups of the noncyclic dicarboxylic acids can be substituted at the terminal ends or along the backbone, and are preferably alpha, omega dicarboxylic acids substituted at each terminal end. Exemplary dicarboxylic acids include $C_{10-12}$ aliphatic di carboxylic acids such as cyclohexane dioic acid, hexanedioic acid (also referred to as adipic acid); $C_{10}$ dicarboxylic acids such as decanedioic acid (also referred to as sebacic acid, or SBA); and $C_{12}$ dicarboxylic acids such as dodecanedioic acid (sometimes abbreviated as DDDA). It will be appreciated that the aliphatic dicarboxylic acid is not limited to these exemplary carbon chain lengths, and that other chain lengths within the $C_{6-20}$ limitation can be used.

The aliphatic ester units and the carbonate units are further derived from a bisphenol of formula (2)

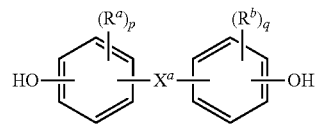

(2)

wherein $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen. In an embodiment, p and q is each 0, or p and q is each 1 and $R^a$ and $R^b$ are each a $C_{1-3}$ alkyl group, specifically methyl, disposed meta to the hydroxy group on each arylene group. Further in formula (2), $X^a$ is a bridging group connecting the two hydroxy-substituted aromatic groups, where the bridging group and the hydroxy substituent of each $C_6$ arylene group are disposed ortho, meta, or para (preferably para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-2}$ hydrocarbon group.

Some illustrative examples of bisphenol compounds that can be used are described, for example, in WO 2013/175448 A1, U.S. 2014/0295363, and WO 2014/072923. Specific dihydroxy compounds include 4,4'-dihydroxybiphenyl, 2,2-bis(4-hydroxyphenyl) propane ("bisphenol A" or "BPA"), 1,6-dihydroxynaphthalene, 2,6-dihydroxynaphthalene, bis (4-hydroxyphenyl)methane, bis(4-hydroxyphenyl)diphenyl-methane, bis(4-hydroxyphenyl)-1-naphthylmethane, 1,2-bis (4-hydroxyphenyl)ethane, 1,1-bis(4-hydroxyphenyl)-1-phenylethane, 2-(4-hydroxyphenyl)-2-(3-hydroxyphenyl)

propane, 1,1-bis(4-hydroxy-3-methylphenyl)cyclohexane, and 1,1-bis(4-hydroxyphenyl)-3,3,5-trimethylcyclohexane ("TMC").

In some embodiments, the poly(aliphatic ester-carbonate) is derived from bisphenol A, as shown in formula (1a)

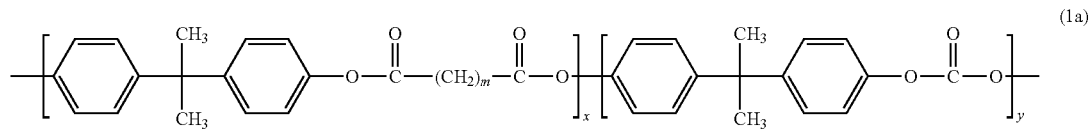

where m is 6 to 20, preferably 8 to 10, and x and y are as defined for formula (1). In an embodiment, the poly(aliphatic ester-carbonate) comprises sebacic acid ester units and bisphenol A carbonate units (formula (1a), where m is 8), and the average mole ratio of x:y is 8:92 to 3:97, or 7:93 to 5:95.

The poly(aliphatic ester-carbonate)s can be used in polymer compositions for the formation of articles. The polymer composition can further include one or more additives which can be added during compounding. The one or more additives can be selected to achieve a desired property, with the proviso that the additives are also selected so as to not significantly adversely affect a desired property of the polymer composition. The additive composition or individual additives can be mixed at a suitable time during the mixing of the components for forming the polymer composition. The one or more additives can include a particulate filler, antioxidant, heat stabilizer, light stabilizer, ultraviolet light stabilizer, UV absorbing additive, plasticizer, lubricant, release agent, antistatic agent, anti-fog agent, antimicrobial agent, colorant, surface effect additive, radiation stabilizer, flame retardant, anti-drip agent, or a combination comprising at least one of the foregoing. The additives are used in the amounts generally known to be effective. For example, the total amount of the additives (other than any impact modifier, filler, or reinforcing agent) can be 0.001 to 10.0 wt %, or 0.01 to 5 wt %, each based on the total weight of the polymer components in the polymer composition. In an embodiment, the polymer composition further comprises an impact modifier, filler, reinforcing agent, anti-oxidant, thermal stabilizer, light stabilizer, ultraviolet light absorber, quencher, plasticizer, lubricant, mold release agents antistatic agent, colorant, blowing agent, flame retardant, antidrip agent, radiation stabilizer, or a combination comprising at least one of the foregoing. In some embodiments, the polymer composition is devoid of any additives not intentionally added to the polymer composition.

The polymer composition can be prepared according to any method that is generally known. In some embodiments, the polymer composition is prepared by melt-mixing or a combination of dry-blending and melt-mixing. Melt-mixing can be performed in single or twin screw type extruders or similar mixing devices which can apply a shear and heat to the components. Melt-mixing can be performed at temperatures greater than or equal to the melting temperatures of the polymer components and less than the degradation temperatures of either of the polymer components. All of the ingredients can be added initially to the processing system. In some embodiments, the ingredients can be added sequentially or through the use of one or more master batches. It can be advantageous to apply a vacuum to the melt through one or more vent ports in the extruder to remove volatile impurities in the composition. In some embodiments the composition is the product of melt-mixing the polymers and, when present, any additives.

The poly(aliphatic ester-carbonate)s and polymer compositions are useful in a wide variety of applications, especially applications where improved stability under hot, humid conditions is desired. Articles of this type include medical articles, food preparation, storage, and consumption articles, housings, and lenses, including automotive lenses, corrective lenses and safety eyewear, as well as other personal protection items such as face shields or personal protection equipment for sports. In some embodiments the articles are thin articles, where it can be particularly difficult to obtain hydrostability. Thin articles include those that include a portion having a thickness in in the range of 0.5 mm to 2 cm, or of 0.1 mm to 10 mm.

The articles can be manufactured by any process, such as extruding, casting, and the like, but molding is especially useful, such as such as injection molding, compression molding, thermoforming, or blow molding. Injection molding is preferred in some embodiments, especially for thin articles.

This disclosure is further illustrated by the following examples, which are non-limiting.

EXAMPLES

The following procedures were used in the Examples.

Determination of hydroxyl or carboxyl groups in polycarbonate polymers: This method applies to polymers that are soluble in chloroform or 1,1,2,2-tetrachloroethane, where free endcapped structures have a reactive functional group such as hydroxyl (—OH) or —COOH groups. Typical sample weights are 200 to 250 mg and in some cases where end groups are extremely low, as much as 400 to 500 mg of sample can be used. The sample is first derivatized using 2-chloro-1,3,2-benzodioxaphosphole and analyzed using $^{31}P$ NMR. Quantification is accomplished by integrating the derivatized end groups against a standard (mesitol or 2,4,6-trichlorophenol (TCP)).

More specifically, the sample is prepared by preparing a 0.5 M solution of chromium(III) acetylacetonate. An internal standard is prepared by adding a known amount of mesitol or trichlorophenol into a tared volumetric flask, adding sufficient of pyridine to dissolve, then filling to volume with the solution of chloroform and chromium(III) acetylacetonate. The sample to be analyzed is placed in a vial and a known amount of the internal standard solution is added, followed by 2-chloro-1,3,2-benzodioxaphosphole (warmed, if solid). The contents of the sample are immediately transferred to an NMR tube and a $^{31}P$ NMR spectrum is immediately acquired. Acquired time domain data are Fourier transformed. A line broadening factor of 3 Hz with exponential apodization is applied before Fourier transformation. Manual phase correction and a multi-point baseline correction are applied. Care is taken to produce a nearly perfectly phased spectrum to obtain a flat baseline.

The mesitol peak (132.12 ppm) or TCP peak (131.09 ppm) are used to determine the chemical shift of the appropriate end group, and are set to a predetermined integral value, allowing quantitation of the —COOH by known methods. The PPC-derivatized $^{31}$P chemical shift (ppm relative to mesitol at 132.12 ppm or TCP at 131.09 ppm) for sebacic acid —COOH is 129.43 ppm.

Molecular Weight Drop Measurement: A measure of quality of PEC copolymers is the drop in molecular weight when subjected to a diisobutylamine (DIBA) test, the "Mw drop test." In the Mw drop test, a polymer sample dissolved in a solvent suitable for GPC is added to two small vials. A strong acid such as 1 to 2 N HCl is added to one vial in an amount equal to the copolymer solution, and DIBA is added to the second vial. After standing both vials for 5 mins, the vial containing DIBA is quenched with HCl. The copolymer phases in each of the vials are separated, purified with distilled, deionized (DI) water, and Mw is measured. Mw drop is then calculated as the percentage reduction in Mw of polymer in the vial with DIBA compared to Mw of polymer in the vial with HCl. A molecular weight drop of less than 10% is considered acceptable.

Determination of Hydrostability: To determine hydrostability, copolymer from a control sample and an experimental sample were each mixed with a stabilizer package and molded into 0.125-inch color chips. Immediately after molding, the samples were measured for Mw of the polymer via GPC. Then, the color chips were placed in the hydrolytic oven, where the samples were hydrolytically aged at 85% humidity and 85° C. ("hydroaging"). Samples were withdrawn after 4 weeks and 8 weeks each, and Mw was measured.

An experimental set was designed for evaluating the conditions for compounding in an extruder which could maintain the hydrostability of poly(aliphatic ester-carbonate)s. The wt % loading of the compounding stabilizer (e.g., a styrene and a glycidyl(meth)acrylate available under the trade name Joncryl®), the % torque in the extruder and the vacuum were identified as most significant variable parameters for study.

The polymer used was a copolymer of SBA and BPA, which contains 90 wt % of high molecular weight polymer and 10 wt % of a low molecular weight polymer with an average weight average molecular weight (MW) between 31,500 to 35,100 Da with a sebacic acid content of 6.5 to 9 mol % as measured by $^1$H NMR spectroscopy or by NIR spectroscopy.

Factorial design was used to create an experimental set as shown in Table 1. The polymer and the compounding stabilizer packages were premixed.

TABLE 1

Compounding experiments

| Sample | Parameter Level* | | | MW at 0 week (Dalton) |
| | Torque (%) | Vacuum (Pascals) | Stabilizer | |
|---|---|---|---|---|
| 1 | 2 | 1 | 2 | 34287 |
| 2 | 1 | 2 | 2 | 33880 |
| 3 | 2 | 1 | 1 | 33541 |
| 4 | 1 | 2 | 1 | 32590 |
| 5 | 2 | 2 | 2 | 35074 |
| 6 | 1 | 1 | 1 | 31169 |
| 7 | 2 | 2 | 1 | 33561 |
| 8 | 1 | 1 | 2 | 32736 |
| 9 | 2 | 2 | 2 | 34072 |
| 10 | 1 | 1 | 2 | 31848 |

*See Table 2 for definition of levels, 1 and 2, in Table

Example 1: Optimized Hydrostability Performance of Compounded Poly(Aliphatic Ester-Carbonate)

The parameter values for the experiment are shown in Table 2.

TABLE 2 parameters

| | Parameters | | |
|---|---|---|---|
| Level | Torque (%) | Vacuum (Pascals) | Stabilizer (wt %) |
| 1 | 50% | 0 | 0.1 |
| 2 | 77% | 67,728 | 0.2 |

To determine the hydrostability performance, the pellets made from these trials were molded to 100 mil (2.54 mm) color chips (5 chips per each pull). The molecular weight reported is the weight average molecular weight of 5 chips (5 chips per trial). The molecular weights were measured at 0 weeks, 2 weeks and 4 weeks of hydro-aging in the hydro-aging chamber. The hydro-aging chamber was set at 85% humidity and 85° C. The zero week sample was not exposed to hydro-aging conditions. The % molecular weight difference is calculated by the equation given below.

$$\% \text{ molecular weight difference} = \frac{MW(\text{sample at 0 week}) - MW(\text{sample at } X \text{ week})}{MW(\text{sample at 0 week})} \times (100)$$

where X=2, 4 or 8.

As another measure of hydrostability, the amount of —COOH end groups as a function of hydro-aging time was studied. The amount of —COOH end group was measured using $^{31}$P NMR methodology. The amount of —COOH end groups in ppm was measured at 0 weeks, 2 weeks, 4 weeks and 8 weeks of hydro-aging in the hydro-aging chamber. The hydro-aging chamber was set at 85% humidity and 85° C. The zero week sample represents starting material that was not exposed to hydro-aging conditions.

When measured as amount of —COOH end groups, similar to % molecular weight change, the best hydrostability performance was obtained when the torque was at 50%, vacuum at 20 and % Joncryl stabilizer at 0.1 or 0.2.

The desirability factor in the JMP software was set as the minimum molecular weight change. The desirability factor estimates the optimum compounding parameters/condition. Based on this, the results were calculated for week 2 and week 4.

The results were then analyzed using a statistical software and are provided in Table 3.

TABLE 3

% molecular weight difference and —COOH end groups as function of week

| Pattern | Torque % | Vacuum (Pascals) | Stabilizer (wt %) | % molecular weight difference 2 Wks | % molecular weight difference 4 wks | —COOH, ppm 0 wks | —COOH, ppm 2 Wks | —COOH, ppm 4 wks |
|---|---|---|---|---|---|---|---|---|
| 122 | 50 | 67,728 | 0.2 | 5.94 | 16.16 | 38 | 63 | 83 |
| 121 | 50 | 67,728 | 0.1 | 6.07 | 12.79 | 32 | 85 | 105 |
| 211 | 77 | 0 | 0.1 | 8.55 | 25.42 | 62 | 138 | 220 |
| 212 | 77 | 0 | 0.2 | 11.67 | 28.26 | 56 | 131 | 379 |
| 222 | 77 | 67,728 | 0.2 | 9.58 | 24.36 | 36 | 121 | 311 |
| 111 | 50 | 0 | 0.1 | 9.57 | 23.38 | 48 | 136 | 234 |
| 221 | 77 | 67,728 | 0.1 | 14.99 | 29.28 | 56 | 154 | 232 |
| 112 | 50 | 0 | 0.2 | 7.76 | 18.06 | 40 | 73 | 147 |
| 222 | 70 | 67,728 | 0.2 | 8.99 | 20.91 | | | |
| 112 | 50 | 0 | 0.2 | 7.69 | 18.04 | | | |

As shown in Table 3, conditions 122 and 121 provided excellent hydrostability, measured both as % molecular weight difference and ppm of —COOH end groups. The remaining sets of conditions (211, 212, 222, 111, 221, 112, 22 and 112) resulted in poorer hydrostability.

In summary, the condition of torque at 50%, vacuum at 67,728 Pascals, and 0.2 wt % compounding stabilizer gave the best result with a 40% relative improvement in hydrostability performance over the existing compounding conditions.

Example 2: Preparation of an Exemplary Hydrostable Poly(Aliphatic Ester-Carbonate) for Compounding In this example, a formulation tank was charged with SBA, BPA, 33 wt % sodium hydroxide solution, water, dichloromethane, triethylamine, and sodium gluconate. The amount of SBA in the reaction mixture was 0.094 moles per mole of BPA, the amount of catalyst was 0.17 moles per mole of BPA, the amount of NaOH was 0.223 moles per mole of BPA, and the amount of sodium gluconate was 0.33 lbs for every 1000 lbs of water in the formulation. The contents of the formulation tank were transferred to a batch polymerization stirred tank reactor. After receiving all reactants, phosgene addition was started to the reactor with no additional 33 wt % NaOH added. PCP endcapping agent was delivered to the reactor as a solution in dichloromethane. The pH in the reactor was maintained at 7.5 by addition of 33% aqueous NaOH until 39% of the total phosgene calculated to be required to complete the reaction was added. The batch total phosgene set point was calculated with 48% excess over the stoichiometric phosgene required for complete polymerization of the batch bisphenol A charge. The pH was then ramped up to 10.3 for rest of the addition. The pH was then ramped up to 10.3 and maintained for rest of the phosgene addition.

Twenty-five polymer batches produced by this reaction process yielded a high flow PEC copolymer with an average Mw of 36,106 Da containing 8.14 mol % SBA. The residual SBA in brine was consistently at below a detectable limit of less than 21.4 ppm as measured by a UPLC coupled with an Evaporative Light Scattering Detector. Mw drop was found to be 0-3.5%. The batch reaction process described in this example illustrates a successful method for preparation of a copolymer of SBA and BPA containing acceptably low residual SBA in reaction brine upon completion of the batch. Hydrostability was determined as described above.

This disclosure further encompasses the following embodiments.

Embodiment 1. A process of preparing a compounded hydrostable poly(aliphatic ester-carbonate), the process comprising providing a hydrostable poly(aliphatic ester-carbonate), wherein the hydrostable poly(aliphatic ester-carbonate) has at least one of a decrease in weight average molecular weight of less than 30%, preferably less than 20% after hydroaging a molded sample for 4 weeks at 85° C. and 85% humidity, a decrease in weight average molecular weight of less than 60%, preferably less than 50% after hydroaging a molded sample for 8 weeks at 85° C. and 85% humidity, or a —COOH end group content of less than 75 parts per million, preferably less than 50 parts per million as measured by $^{31}$P NMR, and compounding in an extruder the hydrostable poly(aliphatic ester-carbonate) and 0.05 wt % to 0.60 wt % of a multifunctional epoxide compounding stabilizer, based on the total weight of the compounded hydrostable poly(aliphatic ester-carbonate), under vacuum of 17000 to 85000 Pascals, and a torque of 30% to 75%, preferably 40% to 60%, to provide the compounded hydrostable poly(aliphatic ester-carbonate), wherein, after compounding, at least one of the following apply:

the inter-sample variability in molecular weight is less than 5%, wherein inter-sample variability is determined by comparing five 100 mil chips of the compounded hydrostable poly(aliphatic ester-carbonate), the % weight average molecular weight (MW) difference is less than 5% after hydroaging at 85° C. and 85% humidity, wherein $$\% \text{ molecular weight difference} = \frac{MW(\text{sample at week 0}) - MW(\text{sample at week } X)}{MW(\text{sample at week 0})} \times (100)$$

where X=2, 4 or 8; or the compounded poly(aliphatic ester-carbonate) has less than 75 ppm of unreacted —COOH end groups measured by $^{31}$P NMR.

Embodiment 2: The process of embodiment 1, wherein the multifunctional epoxide compounding stabilizer comprises
a diglycidyl ester or a polyglycidyl ester of a dicarboxylic acid or a polycarboxylic acid;
a diglycidyl ether or polyglycidyl ether of a diol or a polyol;
a copolymer of styrene and a glycidyl(meth)acrylate; or
a combination comprising at least one of the foregoing.

Embodiment 3: The process of embodiment 2, wherein the multifunctional epoxide compounding stabilizer comprises a copolymer of styrene and a glycidyl(meth)acrylate.

Embodiment 4: The process of any one or more of embodiments 1-3, wherein the vacuum is 64,300 to 71,200 pascals.

Embodiment 5: The process of any one or more of embodiments 1-4, wherein the hydrostable poly(aliphatic ester-carbonate) has a weight average molecular weight of 10,000 to 50,000 Dalton, or 20,000 to 38,000 Dalton, or 20,000 to 25,000 Da, measured by gel permeation chromatography, calibrated using polystyrene standards, corrected for the molecular weight of polycarbonate.

Embodiment 6: The process of any one or more of embodiments 1-4, wherein the hydrostable poly(aliphatic ester-carbonate) comprises 5 to 12 mol %, or 6 to 10 mol %, or 7.5 to 9 mol % of units derived from a $C_{6-20}$ aliphatic dicarboxylic acid.

Embodiment 7: The process of embodiment 7, wherein the $C_{6-20}$ aliphatic dicarboxylic acid is adipic acid, sebacic acid, or dodecanoic acid, preferably sebacic acid.

Embodiment 8: The process of any one or more of embodiments 1-7, wherein the hydrostable poly(aliphatic ester-carbonate) comprises units derived from 4,4'-dihydroxybiphenyl, 2,2-bis(4-hydroxyphenyl) propane, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, 1,1-bis(4-hydroxy-3-methylphenyl)cyclohexane, or 1,1-bis(4-hydroxyphenyl)-3,3,5-trimethylcyclohexane; specifically 4,4'-dihydroxybiphenyl, 2,2-bis(4-hydroxyphenyl) propane.

Embodiment 9: The process of any one or more of embodiments 1-8, wherein compounding comprises extruding; and further optionally comprising processing the extrudate to provide pellets.

Embodiment 10: An article subject to conditions of heat and humidity comprising the compounded hydrostable poly (aliphatic ester-carbonate) prepared by the process of embodiment 1, preferably a medical article, a food preparation, storage, or consumption article, a housing, an automotive article, a lens, or a personal protection item, or an article comprising a portion having a thickness in the range of 0.5 millimeter to 2 centimeter, or of 0.1 to 10 millimeter.

Embodiment 11: A method of improving the hydrostability of a compounded hydrostable poly(aliphatic ester-carbonate), comprising
providing a hydrostable poly(aliphatic ester-carbonate), wherein the hydrostable poly(aliphatic ester-carbonate) has at least one of
a decrease in weight average molecular weight of less than 30%, preferably less than 20% after hydroaging a molded sample for 4 weeks at 85° C. and 85% humidity,
a decrease in weight average molecular weight of less than 60%, preferably less than 50% after hydroaging a molded sample for 8 weeks at 85° C. and 85% humidity, or
a —COOH end group content of less than 75 parts per million, preferably less than 50 parts per million as measured by $^{31}P$ NMR,
and
compounding in an extruder the hydrostable poly(aliphatic ester-carbonate) and 0.05 wt % to 0.60 wt % of a multifunctional epoxide compounding stabilizer, based on the total weight of the compounded hydrostable poly(aliphatic ester-carbonate), under vacuum of 17000 to 85000 Pascals, and a torque of 30% to 75%, preferably 40% to 60%, to provide the compounded hydrostable poly(aliphatic ester-carbonate).

Embodiment 12: The method of embodiment 11, wherein, after compounding, at least one of the following apply:
the inter-sample variability in molecular weight is less than 5%, wherein inter-sample variability is determined by comparing five 100 mil chips of the compounded hydrostable poly(aliphatic ester-carbonate),
the % weight average molecular weight (MW) difference is less than 5% after hydroaging at 85° C. and 85% humidity, wherein $$\% \text{ molecular weight difference} = \frac{MW(\text{sample at week } 0) - MW(\text{sample at week } X)}{MW(\text{sample at week } 0)} \times (100)$$

where X=2, 4 or 8; or
the compounded poly(aliphatic ester-carbonate) has less than 75 ppm of unreacted —COOH end groups measured by $^{31}P$ NMR.

Embodiment 13: A compounded hydrostable poly(aliphatic ester-carbonate) having one or more of the following properties:
the inter-sample variability in molecular weight is less than 5%, wherein inter-sample variability is determined by comparing five 100 mil chips of the compounded hydrostable poly(aliphatic ester-carbonate),
the % weight average molecular weight (MW) difference is less than 5% after hydroaging at 85° C. and 85% humidity, wherein $$\% \text{ molecular weight difference} = \frac{MW(\text{sample at week } 0) - MW(\text{sample at week } X)}{MW(\text{sample at week } 0)} \times (100)$$

where X=2, 4, or 8; or
the compounded poly(aliphatic ester-carbonate) has less than 75 ppm of unreacted —COOH end groups measured by $^{31}P$ NMR.

Embodiment 14: An article subject to conditions of heat and humidity comprising the compounded hydrostable poly (aliphatic ester-carbonate) of claim 13, preferably a medical article, a food preparation, storage, or consumption article, a housing, an automotive article, a lens, or a personal protection item, or an article comprising a portion having a thickness in the range of 0.5 millimeter to 2 centimeter, or of 0.1 to 10 millimeter.

Embodiment 15: A compounded hydrostable poly(aliphatic ester-carbonate) comprising 0.05 wt % to 0.60 wt % of a multifunctional epoxide compounding stabilizer.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments," "an embodiment," and so forth, means that a particular element described in connection with the embodiment is included in at least one embodiment described herein, and may or may not be present in other embodiments. In addition, it is to be understood that the described elements can be combined in any suitable manner in the various embodiments.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl).

"Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. Unless substituents are otherwise specifically indicated, each of the foregoing groups can be unsubstituted or substituted, provided that the substitution does not significantly adversely affect synthesis, stability, or use of the compound. "Substituted" means that the compound, group, or atom is substituted with at least one (e.g., 1, 2, 3, or 4) substituents instead of hydrogen, where each substituent is independently nitro (—NO$_2$), cyano (—CN), hydroxy (—OH), halogen, thiol (—SH), thiocyano (—SCN), C$_{1-6}$ alkyl, C$_{2-6}$ alkenyl, C$_{2-6}$ alkynyl, C$_{1-6}$ haloalkyl, C$_{1-9}$ alkoxy, C$_{1-6}$ haloalkoxy, C$_{3-12}$ cycloalkyl, C$_{5-18}$ cycloalkenyl, C$_{6-12}$ aryl, C$_{7-13}$ arylalkylene (e.g., benzyl), C$_{7-12}$ alkylarylene (e.g., toluyl), C$_{4-12}$ heterocycloalkyl, C$_{3-12}$ heteroaryl, C$_{1-6}$ alkyl sulfonyl (—S(=O)$_2$-alkyl), C$_{6-12}$ arylsulfonyl (—S(=O)$_2$-aryl), or tosyl (CH$_3$C$_6$H$_4$SO$_2$—), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the compound or group, including those of any substituents.

While particular embodiments have been described, alternatives, modifications, variations, improvements, and substantial equivalents that are or presently unforeseen can arise to applicants or others skilled in the art. Accordingly, the appended claims as filed and as they can be amended are intended to embrace all such alternatives, modifications, variations, improvements, and substantial equivalents.

What is claimed is:

1. A process of preparing a compounded hydrostable poly(aliphatic ester-carbonate), the process comprising
providing a hydrostable poly(aliphatic ester-carbonate), wherein the hydrostable poly(aliphatic ester-carbonate) has a percent (%)molecular weight difference of less than 30%, after hydroaging a molded sample for 4 weeks at 85° C. and 85% humidity, and
compounding in an extruder the hydrostable poly(aliphatic ester-carbonate) and 0.05 wt % to 0.60 wt % of a multifunctional epoxide compounding stabilizer, based on the total weight of the compounded hydrostable poly(aliphatic ester-carbonate), under a vacuum of 17,000 to 85,000 Pascals, and a torque of 30% to 65% to provide the compounded hydrostable poly(aliphatic ester-carbonate),
wherein, after compounding, at least one of the following apply:
an inter-sample variability in molecular weight is less than 5%, wherein the inter-sample variability is determined by comparing the weight average molecular weight of five 2.54 mm molded chips of the compounded hydrostable poly(aliphatic ester-carbonate), a percent (%) molecular weight difference is less than 18% after hydroaging a molded sample for 4 weeks at 85° C. and 85% humidity, or the compounded poly(aliphatic ester-carbonate) has less than 140 ppm by weight of unreacted —COOH end groups measured by $^{31}$P NMR, and wherein the % molecular weight difference is determined according to equation (1)

$$\% \text{ molecular weight difference} = \frac{MW(\text{sample at week } 0) - MW(\text{sample at week } X)}{MW(\text{sample at week } 0)} \times (100) \quad (1)$$

wherein MW is the weight average molecular weight and X is the number of weeks.

2. The process of claim 1, wherein the multifunctional epoxide compounding stabilizer comprises a diglycidyl ester or a polyglycidyl ester of a dicarboxylic acid or a polycarboxylic acid;

a diglycidyl ether or polyglycidyl ether of a diol or a polyol;

a copolymer of styrene and a glycidyl(meth)acrylate; or a combination thereof.

3. The process of claim 2, wherein the multifunctional epoxide compounding stabilizer comprises a copolymer of styrene and a glycidyl(meth)acrylate.

4. The process of claim 1, wherein the vacuum is 64,300 to 71,200 Pascals.

5. The process of claim 1, wherein the hydrostable poly(aliphatic ester-carbonate) has a weight average molecular weight of 10,000 to 50,000 Dalton, as measured by gel permeation chromatography, calibrated using polystyrene standards, and corrected for the molecular weight of polycarbonate.

6. The process of claim 1, wherein the hydrostable poly(aliphatic ester-carbonate) comprises 5 to 12 mole percent of units derived from a $C_{6-20}$ aliphatic dicarboxylic acid.

7. The process of claim 1, wherein the $C_{6-20}$ aliphatic dicarboxylic acid is adipic acid, sebacic acid, or dodecanoic acid.

8. The process of claim 1, wherein the hydrostable poly(aliphatic ester-carbonate) comprises units derived from 4,4'-dihydroxybiphenyl, 2,2-bis(4-hydroxyphenyl) propane, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, 1,1-bis(4-hydroxy-3-methylphenyl)cyclohexane, or 1,1-bis(4-hydroxyphenyl)-3,3,5-trimethylcyclohexane.

9. A method of improving hydrostability of a compounded hydrostable poly(aliphatic ester-carbonate), comprising providing a hydrostable poly(aliphatic ester-carbonate), wherein the hydrostable poly(aliphatic ester-carbonate) has a percent (%)molecular weight difference of less than 30% after hydroaging a molded sample for 4 weeks at 85° C. and 85% humidity, and compounding in an extruder the hydrostable poly(aliphatic ester-carbonate) and 0.05 wt % to 0.60 wt % of a multifunctional epoxide compounding stabilizer, based on the total weight of the compounded hydrostable poly(aliphatic ester-carbonate), under vacuum of 17,000 to 85,000 Pascals, and a torque of 30% to 75%, to provide the compounded hydrostable poly(aliphatic ester-carbonate), wherein the % molecular weight difference is determined according to equation $$\% \text{ molecular weight difference} = \frac{MW(\text{sample at week } 0) - MW(\text{sample at week } X)}{MW(\text{sample at week } 0)} \times (100) \quad (1)$$

wherein MW is the weight average molecular weight and X is the number of weeks.

10. The method of claim 9, wherein, after compounding, the compounded hydrostable poly(aliphatic ester-carbonate) has at least one of the following an inter-sample variability in molecular weight that is less than 5%, wherein the inter-sample variability is determined by comparing the weight average molecular weight of five 2.54 mm molded chips of the compounded hydrostable poly(aliphatic ester-carbonate), the percent (%)molecular weight difference is less than 18% after hydroaging a molded sample for 4 weeks at 85° C. and 85% humidity, or the compounded poly(aliphatic ester-carbonate) has less than 140 ppm by weight of unreacted —COOH end groups after hydroaging for 4 weeks at 85° C. and 85% humidity, as measured by $^{31}$P NMR.

11. The process of claim 1, wherein the percent (%) molecular weight difference is at least 40% less than a percent (%) molecular weight difference, after hydroaging molded samples for 4 weeks at 85° C. and 85% humidity, of a comparative compounded hydrostable poly(aliphatic ester-carbonate) prepared by compounding the same amounts of the hydrostable poly(aliphatic ester-carbonate) and the multifunctional epoxide compounding stabilizer at the same torque and under a vacuum that is less than 17,000 Pascals.

12. The process of claim 1, wherein the percent (%) molecular weight difference is at least 30% less than a percent (%) molecular weight difference, after hydroaging molded samples for 4 weeks at 85° C. and 85% humidity, of a comparative compounded hydrostable poly(aliphatic ester-carbonate) prepared by compounding the same amounts of the hydrostable poly(aliphatic ester-carbonate) and the multifunctional epoxide compounding stabilizer under the same vacuum and at a torque that is greater than 65%.

13. The process of claim 1, wherein the percent (%) molecular weight difference is at least 40% less than a percent (%) molecular weight difference, after hydroaging molded samples for 4 weeks at 85° C. and 85% humidity, of a comparative compounded hydrostable poly(aliphatic ester-carbonate) prepared by compounding the same amounts of the hydrostable poly(aliphatic ester-carbonate) and the multifunctional epoxide compounding stabilizer under a vacuum that is less than 17,000 Pascals and at a torque that is greater than 65%.

14. The process of claim 1, wherein the amount of unreacted —COOH end groups is at least 40% less than an amount of unreacted —COOH end groups, after hydroaging molded samples for 4 weeks at 85° C. and 85% humidity, of a comparative compounded hydrostable poly(aliphatic ester-carbonate) prepared by compounding the same amounts of the hydrostable poly(aliphatic ester-carbonate) and the multifunctional epoxide compounding stabilizer at the same torque and under a vacuum that is less than 17,000 Pascals.

15. The process of claim 1, wherein the amount of unreacted —COOH end groups is at least 40% less than an amount of unreacted —COOH end groups, after hydroaging molded samples for 4 weeks at 85° C. and 85% humidity, of a comparative compounded hydrostable poly(aliphatic ester-carbonate) prepared by compounding the same amounts of the hydrostable poly(aliphatic ester-carbonate) and the multifunctional epoxide compounding stabilizer under the same vacuum and at a torque that is greater than 65%.

16. The process of claim 1, wherein the amount of unreacted —COOH end groups is at least 60% less than an amount of unreacted —COOH end groups, after hydroaging molded samples for 4 weeks at 85° C. and 85% humidity, of a comparative compounded hydrostable poly(aliphatic ester-carbonate) prepared by compounding the same amounts of the hydrostable poly(aliphatic ester-carbonate) and the multifunctional epoxide compounding stabilizer under a vacuum that is less than 17,000 Pascals and at a torque that is greater than 65%.

17. The process of claim 1, wherein the amount of unreacted —COOH end groups is at least 30% less than an amount of unreacted —COOH end groups of a comparative compounded hydrostable poly(aliphatic ester-carbonate) prepared by compounding the same amounts of the hydrostable poly(aliphatic ester-carbonate) and the multifunctional epoxide compounding stabilizer under a vacuum that is less than 17,000 Pascals and at a torque that is greater than 65%.

18. The process of claim 1, wherein
the multifunctional epoxide compound stabilizer is present in an amount of 0.05 to 0.4 wt %,
the vacuum is 60,000 to 70,000 Pascals, and
the torque is 40% to 60%.

19. A compounded hydrostable poly(aliphatic ester-carbonate) prepared by the process of claim 1, wherein the amount of the multifunctional epoxide compounding stabilizer is 0.1 wt % to 0.2 wt %.

20. The process of claim 1, wherein the amount of the multifunctional epoxide compounding stabilizer is 0.1 wt % to 0.2 wt %.

* * * * *